Figure 2:
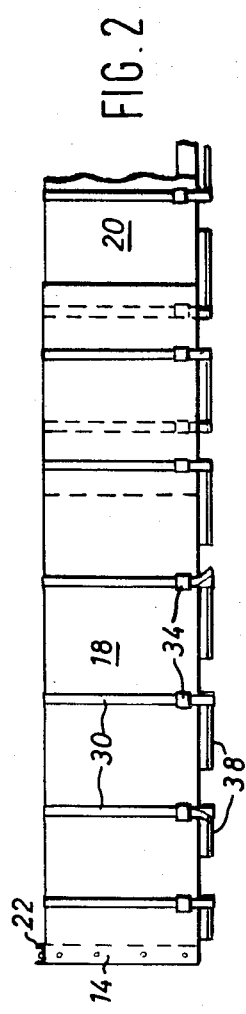

United States Patent [19]
Tomson et al.

[11] 3,762,760
[45] Oct. 2, 1973

[54] ROAD VEHICLES OF OPEN CONSTRUCTION

[75] Inventors: David John Martin Tomson; John Francis Charles Sergeant, both of London, England

[73] Assignee: Whitbread & Company Limited, London, England

[22] Filed: Nov. 5, 1971

[21] Appl. No.: 196,058

[52] U.S. Cl. ............................ 296/100, 280/179 A
[51] Int. Cl. .............................................. B60p 7/00
[58] Field of Search ............................ 296/100, 98; 280/179 A; 105/367, 369 A, 37 N

[56] References Cited
UNITED STATES PATENTS

| | | | |
|---|---|---|---|
| 2,969,284 | 1/1961 | Ambli | 296/100 |
| 3,420,193 | 1/1969 | Austgen | 105/367 |
| 3,615,117 | 10/1971 | Neidlinger | 296/100 |
| 2,991,524 | 7/1961 | Dobrikin | 105/369 A |

Primary Examiner—Benjamin Hersh
Assistant Examiner—Robert R. Song
Attorney—Laurence H. Pretty

[57] ABSTRACT

A road vehicle having a load carrying chassis to which is secured a first series of rods extending longitudinally thereof on both sides, each rod having mounted thereon for relative longitudinal movement a respective one of a series of webs. To cover the load, a sheeting is attached to a headboard of the vehicle and has a second series of webs secured thereto at intervals along its length, respective ones of the first and second series of webs being rapidly connectable and releasable by tongue and buckle devices.

14 Claims, 6 Drawing Figures

PATENTED OCT 2 1973    3,762,760

SHEET 1 OF 3

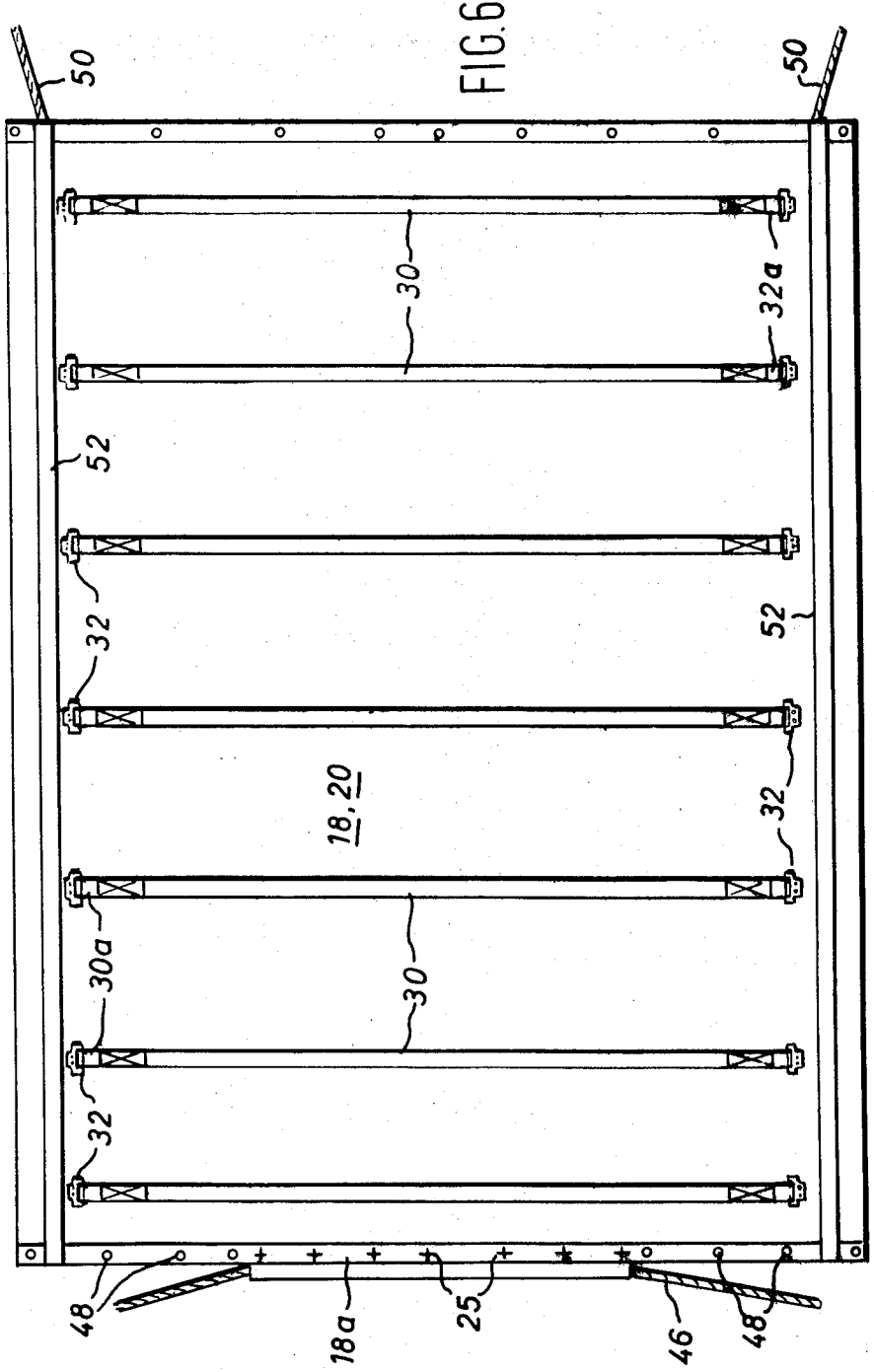

ROAD VEHICLES OF OPEN CONSTRUCTION

The invention relates to road vehicles of open construction having a headboard and a flooring for the carrying thereon of a load.

The invention finds particular application in a platform vehicle in the form of a trailer or semi-trailer which is to be loaded with, for example, crates or metal containers stacked on pallets, the load being then covered and secured with a sheeting.

An object of the invention is to provide means enabling the load to be covered and secured by the sheeting in a rapid manner.

According to the invention, there is provided a road vehicle comprising a vehicle chassis having a headboard and a flooring for the mounting thereon of a load; a sheeting for covering and securing the load; means for attaching the sheeting to the headboard; a plurality of securing means for securing each side of the sheeting to the vehicle chassis, each securing means including a first member attached to the sheeting and a second member connected to the chassis by attachment means, the attachment means permitting the second member to be moved longitudinally of the chassis to bring the first and second members into vertical alignment, the first members being spaced longitudinally of the sheeting, and the first and second members being capable of being rapidly connected together and rapidly released and being completely separable when so released.

Figure 1:
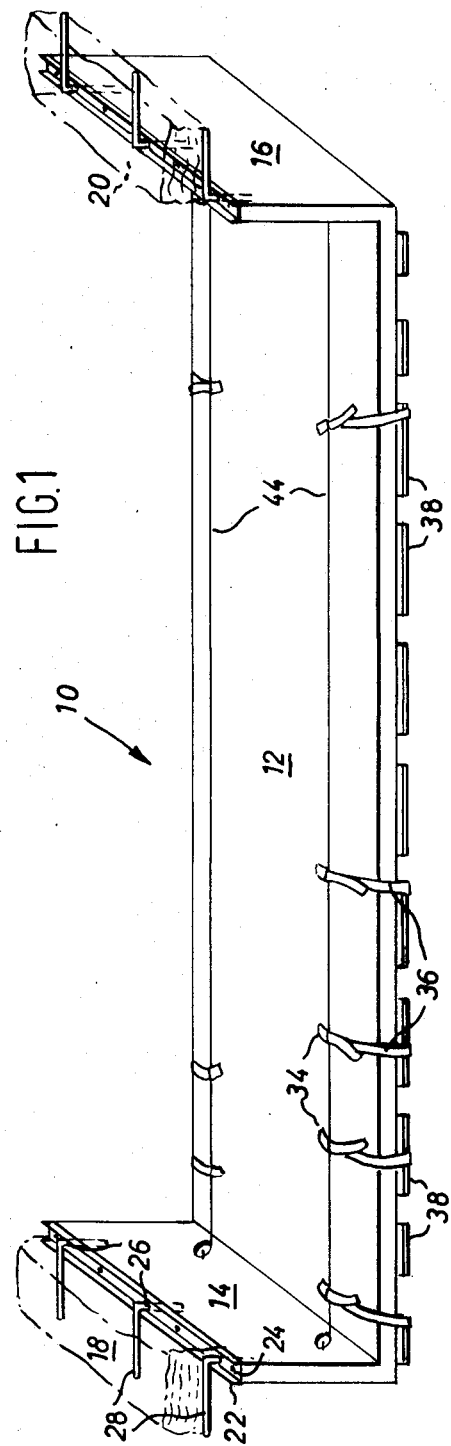
Figure 3:
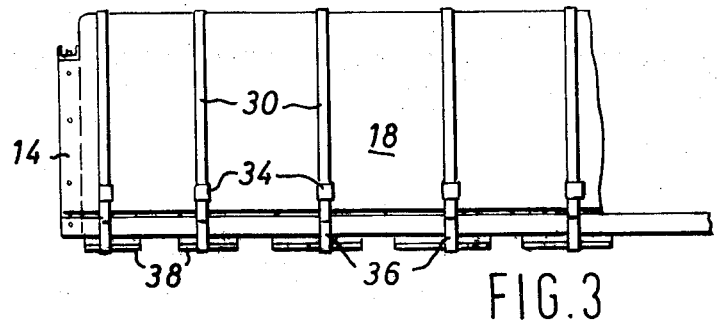
Figure 4:
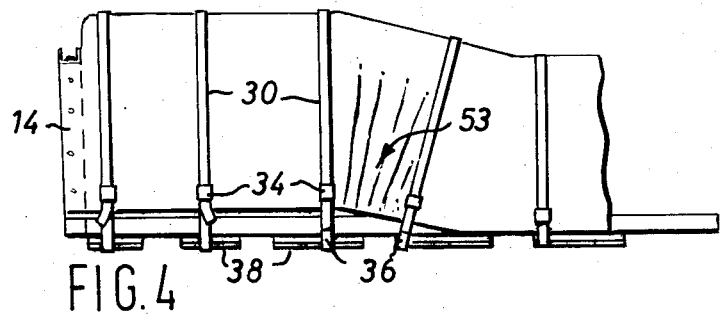
Figure 5:
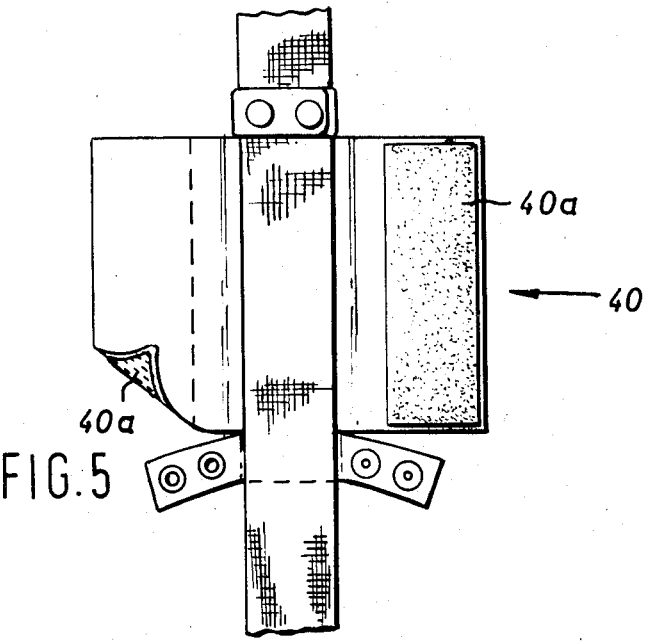

An embodiment of the invention will now be described by way of example only with reference to the accompanying drawings, in which:

FIG. 1 is a perspective view of the upper part of a trailer according to the invention, FIG. 2 is a side view of the trailer of FIG. 1 showing the sheeting covering and securing a load of height level with the top of the headboard, FIG. 3 is a side view similar to FIG. 2 showing the sheeting covering and securing a load of height higher than the top of the headboard, FIG. 4 is a side view similar to FIG. 2 showing the sheeting covering and securing a load of varying height starting higher than the top of the headboard and sloping downwards, FIG. 5 shows diagrammatically a device for keeping the tension-free portion of the web in a folded condition, and FIG. 6 is a plan view of a sheeting associated with the trailer of FIG. 1.

Referring to the drawings, the road vehicle semi-trailer 10 of open construction includes a platform or flooring 12, a headboard 14 and a second headboard which is sometimes called a tailboard 16. The headboard and tailboard are provided with a front sheeting 18 and rear sheeting 20 respectively for covering and securing the load, the two sheetings overlapping each other at the centre of the semi-trailer when covering the load. The forward end of the front sheeting has a portion 18a centrally thereof corresponding to the top edge of the headboard. This portion of the sheeting is clamped between the top face of the headboard and a channel-shaped metal member 22 disposed thereabove by bolts (not shown) which pass through holes 24 in the bottom of the channel-shaped member, holes 25 in the portion of the sheeting 18b and tapped holes (not shown) extending vertically downwards in the headboard.

Further holes 26, spaced apart along the bottom of the channel-shaped member are aligned with further holes in the portion of the sheeting and untapped vertically extending holes in the headboard. The vertically extending arms of a plurality of L-shaped rods 28 are slidably mounted in respective ones of the untapped holes in the headboard. The L-shaped rods can either be disposed with their horizontal arms resting on the bottom of the channel-shaped member or they can be raised and the horizontal arms pivoted forwardly to rest each in corresponding notch (not shown) in the forward edge of the channel-shaped member. In this position, the L-shaped rods form a support for the sheeting when not in use, as described hereinafter.

A plurality of securing devices are provided for securing each side of the sheeting to the chassis of the semi-trailer. Each securing device includes a strap 30 of webbing sewn on to the sheeting so as to provide a short vertically extending free end portion 30a at the bottom of the side of the sheeting. Each free end portion has a tongue 32 which co-operates with and is securable to a buckle 34 associated with a respective one of a plurality of straps 36 of webbing. Each strap 36 has a small loop at one end which passes round a respective one of a plurality of metal rods 38 secured at intervals to the underside of the chassis of the trailer and extending longitudinally thereof. The straps 30 attached to the sheeting are approximately in alignment with the respective straps 36. The buckle 34 is also associated with the strap 36 for tensioning the connection between the strap 30 and the strap 36. The tensioning is carried out by means of pulling down at a large loop which is at the free end of the strap 36. The ends of each rod 38 are slidably mounted in holes respectively in each of a plurality of pairs of spaced apart vertical brackets (not shown) which may be welded to the underside of a longitudinally extending strip under the chassis. Each end, or one end, of each rod is threaded to receive a nut for securing its respective rod to the brackets.

The tongue and buckle of each securing device can be rapidly connected together and released, and on release they are completely separable. The securing device may be in the form of an automobile seat-belt quick-release securing device such as one commonly known under the trademark "Britax".

The straps 30 attached to the sheeting are spaced apart along the length of the sheeting at intervals of ½ to 2 metres. The spacing is likely to be closer when within 2 metres of the headboards. Each rod has a length somewhat less than the spacing between its respective strap 30 and an adjacent strap 30. The centre rods 38 on each side of the trailer may each have two straps 36 to allow for high loads which give less overlap on the sheeting.

Each strap 36 is provided with a strap "tidy-grip" device 40 including a pair of flaps 40a with a material such as that known under the trademark "Velcro". When each securing device has been tensioned, the tension-free part of strap 36 with its large loop, instead of being allowed to hang loosely, may be folded back one or more times so as to lie between the flaps. The flaps are then folded towards each other in overlapping relationship and bind together in a loop to retain the folded strap portion against the rest of the strap 36 and the sheeting when in use round a load and against the rest of the strap 36 when all the latter are hanging down at the side of an empty semi-trailer.

When the semi-trailer is travelling empty, the straps 36 with their buckles 36 are placed on top of the flooring 12 at full length with the Velcro flaps, if fitted, undone. It may be desirable, particularly in the event of a long-distance journey, to secure the tensioning straps. For this purpose, either of the headboards 14, 16 may be provided with one or two spring tensioned retractable lines 44 which can be threaded through the large loops of the tensioning straps and secured to a hook at the far end of the platform. The front sheeting is provided at its forward side with a cord 46 extending, in use, down from the top of the side edge of the headboard through a series of eyelets 48 along the forward side of the sheeting. The cord is attached, between eyelets, to a series of hooks (not shown) secured at spaced intervals along the side return faces of the headboard. Two second cords 50 are each disposed in a horizontal passage 52 formed in the side of the sheeting near or at the bottom thereof and extending the length of the sheeting. The second cords are utilised to prevent billowing at the bottom of those side portions 53 of the sheeting when loads have a partially sloping top surface.

The rear sheeting is secured to the tailboard and chassis in exactly the same manner as that in which the front sheeting is secured to the headboard and chassis except that in this case hooks along the side return faces of the tailboard may not be necessary and the first mentioned cord may merely be tied direct to two hooks under the bottom of the tailboard.

In operation, when the trailer is unloaded, the front and rear sheetings, which are clamped to the headboards by the bolts passing through the channel-shaped members, are rolled up, first at the sides and then along the top, and are supported on the L-shaped rods which have been raised and swivelled so that their horizontal arms rest in the notches in the channel-shaped members.

When loading has been completed, the sheetings are unrolled so as to cover the load. The L-shaped arms are pivoted and lowered so that their horizontal arms rest on the bottom of the channel-shaped members. The sheetings are quickly secured to the trailer chassis by coupling the tongues to the corresponding buckles and pulling the tensioning straps 36 so as to tighten up the connections. The cords 46 are attached to the hooks on the headboard and the cords 50 are tightened to minimise any billowing at the bottom of the sides of the sheets and then tied to two or more hooks under the side of the chassis.

To uncover the load preparatory to unloading, the securing devices are released, the tongues and buckles being instantaneously separable. The cords 46 are released from the hooks and the cords 50 untied and, if necessary, loosened. The sheetings can then be rolled back and supported again on the L-shaped rods which have been raised, swivelled and made to project.

If the semi-trailer is loaded with items such as palletised crates and metal containers so that the height of the load is level with the top edge of the headboards (see FIG. 2), the straps 36 will be at the rear end of their respective rods 38.

If the load is higher than the headboards, (see FIG. 3), the straps 36 will be displaced forwardly of the rear ends of the rods 38. If the load has a sloping top surface (see FIG. 4) the straps 36 immediately below the sloping surface will be positioned towards the forward ends of their rods 38. In this way, the associated straps 30 and 36 of the sheetings can be positioned substantially in alignment with each other in spite of displacement in the sheetings lengthwise of the chassis due to loads of different heights and ensures that the straps can be set at right angles to a top of a load even if sloping to minimise strain.

It will be apparent that the semi-trailer described above enables the load to be covered and secured in a rapid manner. Furthermore, the sheetings can be rapidly disengaged from the chassis for purposes of unloading. As the sheetings are anchored to the headboards they will not be liable to deterioration to the same extent as a sheeting which is not so anchored and which may be damaged for example by contact with a jagged surface when being put on the vehicle, removed from the vehicle, or while on the ground near the vehicle.

The provision of a front and rear headboard permits side loading and unloading to be carried out simultaneously and reduces turn round time. The first load is put on tight against one headboard and leaves a gap at the other end between the load and the other headboard. As soon as one pallet or portion of the first load is removed, it is possible to start stacking empties or another load up against the other headboard for the return or another journey.

It will be apparent that the method of covering and securing the load described hereinbefore enables the load to be secured in a thorough and safe manner. The loading and unloading can be carried out in a rapid manner.

Furthermore, the sheeting is enabled to have a longer life. It can readily be maintained with a neat appearance and be useful for advertising purposes.

We claim:

1. A road vehicle comprising a vehicle chassis having a head board and a flooring for the mounting thereon of a load; a sheeting for covering and securing the load; means for attaching the sheeting to the head board; a plurality of securing means for securing each side of the sheeting to the vehicle chassis, each securing means including a transversely extending, flexible elongate first member fixedly attached to the sheeting and a second member connected to the chassis by attachment means, the attachment means permitting the second member to be moved longitudinally of the chassis to bring the first and second members into vertical alignment, the first members being spaced longitudinally of the sheeting, one of said members having a tongue at a free end thereof, and the other of said members having a buckle at a free end thereof, the tongue and buckle being rapidly connectable and releasable in the manner of an automobile seat belt securing device.

2. A road vehicle according to claim 1, wherein the attachment means are provided by a series of rods secured to the chassis at intervals along its length and extending longitudinally thereof.

3. A road vehicle according to claim 2, wherein each rod has a respective one of said second members connected thereto and wherein the length of each rod is less than the spacing between its respective first member and an adjacent first member.

4. A road vehicle according to claim 2, wherein said first and second members comprise first and second flexible elongate webs, each said first web being fixedly secured along a major portion of its length to said sheet, each said second web being connected with one of said rods for longitudinal sliding motion thereof into alignment with the associated one of said first webs, said tongue and buckle being fixedly secured to adjacent free ends of said webs for connecting said first and second webs together.

5. A road vehicle according to claim 4, wherein the web of each said second member is looped around its respective rod to permit longitudinally movement thereof relative to the rod, said web carrying said buckle.

6. A road vehicle according to claim 5, wherein the web of each second member has a tensioning portion for tensioning said first and second members, and wherein a device is provided to enable the tension-free portion of the web to be retained in a folded condition.

7. A road vehicle according to claim 1, wherein the sheeting attaching means includes a channel-shaped member secured to the top edge of the headboard, a forward edge of the sheeting being clamped between said channel-shaped member and said top edge.

8. A road vehicle according to claim 1, and including means carried by the headboard for supporting the sheeting in a rolled up or folded condition.

9. A road vehicle according to claim 8, wherein said supporting means includes a plurality of L-shaped rods each having a vertical arm located in a hole in the headboard, the horizontal arm of each rod being pivotable from a position within the channel of said channel-shaped member to a position extending forwardly of the headboard.

10. A road vehicle according to claim 1, and including means for securing the free ends of said second members to the flooring of the vehicle when empty.

11. A road vehicle according to claim 10, wherein said free end securing means includes a spring tensioned retractable line positioned within the headboard and extendable longitudinally of the chassis, said free ends being attachable to said line.

12. A road vehicle according to claim 1, and including cords extending above the forward and side edges of the sheeting to prevent or reduce billowing thereof when in an operative condition.

13. A road vehicle according to claim 1, wherein the chassis has a tailboard, and wherein a second sheeting is provided for attachment to the tailboard.

14. A road vehicle comprising a vehicle chassis having a head board and a flooring for the mounting thereon of a load; a sheeting for covering and securing the load; means for attaching the sheeting to the head board; a plurality of securing means for securing each side of the sheeting to the vehicle chassis, each securing means including a first member attached to the sheeting and extending transversely across the width thereof, and two second members connected to the chassis at opposite sides thereof by attachment means and each connectible to a respective one of opposite ends of the first member, the attachment means permitting each second member to be moved longitudinally of the chassis to bring the first and second members into vertical alignment, the first members being spaced longitudinally of the sheeting, and means for rapidly connecting and disconnecting said first and second members together and tensioning after the members are connected together.

* * * * *